United States Patent [19]

Miller

[11] 4,210,456
[45] Jul. 1, 1980

[54] METHOD FOR PRODUCING A STORABLE MORTAR

[75] Inventor: Richard L. Miller, Mountain Green, Utah

[73] Assignee: Ultra Mortar, Inc., Ogden, Utah

[21] Appl. No.: 898,877

[22] Filed: Apr. 21, 1978

[51] Int. Cl.² .............................................. C04B 7/352
[52] U.S. Cl. .......................................... 106/92; 106/98
[58] Field of Search ............................. 106/92, 315, 98

[56] References Cited

U.S. PATENT DOCUMENTS

| | | | |
|---|---|---|---|
| 3,141,857 | 7/1964 | Sommer | 106/92 |
| 3,151,995 | 10/1964 | Nemeth | 106/98 |
| 3,432,317 | 3/1969 | Kelly et al. | 106/92 |
| 4,073,658 | 2/1978 | Ohtani et al. | 106/315 |

*Primary Examiner*—James Poer
*Attorney, Agent, or Firm*—Kenneth E. Darnell

[57] ABSTRACT

A method for controlling the setting of a cementitious composition of matter, the present invention allows mixing of a mortar and retention thereof for a prolonged period of time before use, the mortar setting at least as rapidly as normally when applied to brick, block, or the like during the period of retention. The method involves the addition of an effective amount of saccharide polymers having a size of from three glucose units to on the order of 25 glucose units to a cementitious mixture, the additive optionally including air entrainment agents and similar agents such as have been previously used in the formulation of mortars. The method further involves entraining air in the mortar mixture to a particular degree which allows control of the setting rate of the mortar mixture when evaporation from the mixture is controlled. The invention further provides cementitious compositions of matter capable of being stored in a plastic state for a prolonged period of time, the composition setting at least as rapidly as normally when applied to brick, block, or the like.

7 Claims, No Drawings

METHOD FOR PRODUCING A STORABLE MORTAR

BACKGROUND OF THE INVENTION

1. Field of the Invention

The invention relates to cementitious compositions which set on admixture with water and particularly to a method for controlling the temporal interval between mixture of the compositions with water and the setting thereof.

2. Description of the Prior Art

Mortar compositions have long been used for construction purposes, those mortar compositions presently in use usually containing portland cement and aggregates which harden on addition of water. Portland cement compositions are hydraulic in nature, that is, such compositions are capable of hardening under water or when not in the presence of air. On addition of water to hydraulic cement compositions, a process known as "hydraulic hydration" occurs, the composition hardening as a result of this hydration. According to present practices, additive compositions are known which are primarily used to strengthen hydraulic cement compositions. Additive compostions are also known which retard or accelerate the setting of hydraulic cement compositions. However, retarding compositions have not been greatly effective due to the unpredictability of their behavior, certain cement compositions being completely inhibited from hydration when such additive compositions are utilized. It has not been possible, therefore, according to prior art practices to controllably retard the setting of mortar compositions, particularly hydraulic cement compositions, in a manner which allows holding of mortar in a plastic, workable state for any extended period of time and still retain the capability of immediate setting of the mortar when the mortar is actually used at some time during this holding period.

Additives previously used in the formulation of mortar include agents which act to strengthen the mortar, entrain air in the mortar, plasticize the mortar, color the mortar, and vary setting times of mortars. As disclosed by Kelly et al in U.S. Pat. No. 3,432,317, saccharide polymers inter alia are added to cementitious materials in order to strengthen the hardened mortar. The saccharide polymers so disclosed provide a strengthening function without retarding the setting rate of the mortar according to the invention disclosed by Kelly et al. It is noted in the aforesaid patent that sugars, such as the glucosaccharides of the patent, are retarders of cement hydration and are unpredictable in use. Therefore, the teachings of Kelly et al do not provide an additive for or a method for controlling the setting of a cementitious material, particularly a hydraulic cement, which allows a hydraulic mortar to be formed and held for an extended period of time.

In U.S. Pat. No. 3,432,316, Kelly et al disclose the addition of extracts or portions of the tobacco plant to hydraulic cement in order to increase the strength of the concrete formed thereby and to cause a degree of retardation of hardening of the cement. Kelly et al do not disclose a method for maintaining a hydraulic mortar mixture in a plastic, workable condition for an extended period of time. Kelly et al further do not disclose a method for utilizing a mortar mixture which has been or can be maintained in a plastic, workable condition for an extended period of time and which can be used at any time during this extended period of time with the mortar mixture setting up as rapidly or more rapidly than normally on application of said mortar mixture to brick, block, or the like.

SUMMARY OF THE INVENTION

The present invention particularly provides a method for suspending the hydraulic hydration of hydraulic cementitious mixtures, such as of portland cement and the aggregate and additives normally mixed therewith. The present method comprises the admixture with cementitious mixtures, particularly hydraulic cementitious mixtures, of an additive comprised of glucosaccharide polymers preferably having a size of three glucose units to approximately 25 glucose units. The hydraulic cementitious mixtures thus formed, which mixtures may contain pozzolanic materials, such as fly ash, coloring agents, air entraining agents, and the like, can be stored in sealed containers and be thus held in a plastic, workable condition for a period of approximately 72 hours. The invention further teaches that this stored mixture can be used at any time during the storage period with the result that the mixture sets as rapidly or more rapidly than normally when applied to block, brick, and the like. Therefore, the invention enables a user of mortar to purchase or make up at one time a sufficient amount of mortar needed for a time period of up to three full days. The mortar needed for most jobs can thus be purchased, delivered, and/or made up at one time, thereby introducing desirable economies into the marketing and use situations surrounding the utilization of mortar. Further, mortar sufficient for use over an extended time period can be made up at a central facility and delivered to job sites in quantities sufficient for two to three days usage, the quality of mortar made under such circumstances being controlled more readily than is possible for mortar made up at a job site.

The present invention, therefore, makes possible the single delivery of quantities of pre-mixed mortar formulated under relatively precise quality control conditions, which quantities are sufficient for multiple day usage and which can be used at any time during a storage period of up to three days. The hydraulic hydration action of the stored mortar is suspended according to the invention until such time as the mortar is actually used and applied to brick, block, and the like, in a normal manner. When used, the mortar immediately begins normal setting and strength development, some mortars hardening to a given strength even more quickly than when used normally. Thus, a user of the mortar according to the invention can maintain a single delivery of mortar in a usable plastic state for an extended period of time and retain normal workability, consistency, setting rate, and strength development.

Application of mortar formulated according to the invention to brick, block, and the like, initiates hydraulic hydration of the mortar due to absorption of moisture from the mortar not only by the atmosphere but also by the brick and block itself. Therefore, the present invention teaches the retardation of setting of mortar for an extended period of time which is at least of the order of 72 hours under sealed conditions whereby moisture evaporation from the mortar is minimized, the mortar remaining in a workable, plastic condition. Further, the invention teaches the immediate setting and attainment of normal strength when applied to brick, block, and the like, on use of the mortar at any time during the storage period.

The present invention further teaches the entrainment of air in a mortar having the storage and use characteristics referred to herein, air being entrained in the mortar in percentages greater than normal in order to assist in the attainment of the aforesaid storage and use characteristics of the mortar. Air entrained in the mortars according to the invention is within a percentage range by volume of the mortar of 12% to 35%, the higher percentage amounts being particularly suited to attainment of the storage and use characteristics according to the invention.

It is, therefore, an object of the present invention to provide a method for controlling the setting of a cementitious composition of matter, the present method particularly allowing the mixture of a mortar and retention thereof for a prolonged period of time before use, the mortar setting at least as rapidly as normally when applied to brick, block, or the like, at any time during the period of retention.

It is another object of the invention to provide a method comprising the addition of an effective amount of saccharide polymers having a size of from three glucose units to on the order of 25 glucose units to a hydraulic cementitious mixture and subsequently storing the mortar under conditions which prevent evaporation of moisture from the mortar, the mortar then being capable of usage at any time during a prolonged storage period without loss of desirable setting and strength development characteristics.

It is a further object of the invention to provide a method for suspending the hydration of hydraulic cementitious mixtures, such as of portland cement and the aggregates and additives normally admised therewith, the present method comprising admixture with the mortar of glucosaccharide polymers, entrainment of relatively large quantities by volume of air in the mortar, and the prevention of moisture evaporation from the mortar until the time of actual use, such as by storage of the mortar is sealed containers.

Other objects and advantages of the invention will become more readily apparent in light of the following detailed description of the preferred embodiments of the invention.

DESCRIPTION OF THE PREFERRED EMBODIMENTS

In a preferred practice of the present invention, a mortar which can be stored and maintained in a plastic workable state for an extended period of time is mixed at a central location for delivery to job sites. The mortar formulated according to the invention is containerized at the mixing location, the mortar being maintained in sealed containers for storage at the job sites. In this fashion, quality control of the mortar produced according to the invention is improved due to the fact that the mortar is mixed at a central location rather than on the individual job sites. The teachings of the present invention allows such mixing at a central location since the mortar according to the invention can be stored for a period of 72 hours or more without loss of workability. Therefore, relatively lower quality small batches of mortar need not be continually mixed at job sites so that only enough mortar necessary for use over a short future time period is provided. According to the present invention, quantities of mortar sufficient for use over a two to three day time period can be centrally mixed with control of the quality thereof and then stored at job sites without loss of workability. Due to mixing of the mortar at a central location, there is no need to provide water at job sites or to provide sand stockpiles and quantities of bagged cementitious materials which need to be covered and protected against the elements. The present invention further allows the use of pozzolanic materials, particularly fly ash, which allows an increase in the strength of the mortar.

The present method particularly comprises the admixture with a hydraulic mortar mix of cement, aggregate, and sufficient water to effect hydraulic setting of the cement mix with an additive comprising saccharide polymers having a size of from three glucose units to on the order of 25 glucose units. Saccharide polymers useful in the practice of the present invention are described in U.S. Pat. No. 3,432,317, the disclosure of this patent being incorporated hereinto by reference. When using additives according to the aforesaid patent, it is to be understood that lesser amounts of glucosaccharides are normally used when more rapid hardening of the cementitious mixture is desired, more glucosaccharides being used when retardation is desired. Similarly, lesser amounts of chlorides or other desiccants are to be used when retardation of the setting of a cementitious mixture is desired, a greater amount of said substances being used when it is desired for the mixture to harden more rapidly.

The present invention particularly contemplates the usage of additive mixtures disclosed in the aforesaid patent which include as the primary constituent the glucosaccharides so disclosed, the glucosaccharides being particularly present in the mixtures according to the invention in quantities greater than those quantities disclosed in the aforesaid patent.

The present method provides a hydraulic mortar mixture which can be used at any time during the prolonged storage period as aforesaid, the mortar immediately setting and developing usual strength characteristics as soon as the mortar is applied to brick, block, and other similar building materials. Accordingly, the use of the present invention does not result in a delay in setting time or strength development as is the case with prior retardation compositions and methods. It is a teaching of the invention that the normal hydraulic hydration process which occurs in the otherwise retarded settability of the present mortar mixtures is accelerated by absorption of moisture by the building materials to which the mortar is applied. Accordingly, the mortar immediately begins setting at least as rapidly as it normally would if the mortar had not been formulated with an additive according to the invention which allows storage of the mortar for a prolonged period of time. Further, the normal strength development of the mortar is not affected by the process of the invention.

As can be appreciated by the disclosure provided herein, the present invention provides a method of suspending the hydraulic hydration action of mortar mixtures, the invention allowing either immediate use of the mortar or use after a prolonged storage period. While the glucosaccharides essentially disclosed in the aforesaid patent are utilized as the additive according to the present method which acts to accomplish the unexpected results and advantages of the present invention, it is to be noted that there is no teaching in the aforesaid patent which would lead one of ordinary skill in the art to the conclusion that such additives would be useful to produce the results and advantages provided by the present invention, there particularly being no indication in the aforesaid patent that the prevention of moisture evaporation from mortars formulated according to the invention would prevent setting of such mortars for prolonged periods of time.

The methods of the present invention particularly relate to formulation of mortars which contain as one constituent thereof hydraulic cements such as portland cement, such cements typically being comprised of finely divided gray powder composed of lime, alumina, silica and iron oxide as tetracalcium aluminoferrate, tricalcium aluminate, tricalcium silicate, and dicalcium silicate. Such cements typically also comprise small amounts of magnesia, sodium, potassium and sulphur. Portland cement when provided with water for hydration will harden under water, air not being required for hardening of such mixtures. Sand and other substantially inert aggregate material is usually added to portland cement as a diluent. Other additives, such as coloring additives, air entrainment agents, and the like can also be added to portland cement in a known fashion and can be used in the practice of the present invention.

It is particularly to be noted that air entrainment agents can be added to the mortar compositions formed according to the present methods, such air entrainment agents being well-known in the art. Exemplary of such agents is the proprietary material known commercially as Vinsol Resin, a product of the Hercules Powder Company, which is a hard, brittle, dark-colored, thermoplastic resin derived from pine wood, and containing phenol, aldehyde, and ether groups. This product in supplied in lump, flake, and pulverized forms, and as a stable emulsion. Other air entrainment agents are commercially available and are well-known in the art. Such air entrainment agents can be used according to the invention to increase the volumetric quantity of air entrained within mortars according to the present invention when the volumetric quantity of air entrained within the mixtures are to be increased over the quantities provided by the admixture into the mortar of the glucosaccharide additives according to the invention. While mortars useful according to the invention can be formulated with a quantity of entrained air as low as 12% of the volume of the mortar, it is preferred that the quantity of air entrained be equivalent to 20 to 30% of the volume of the mortars. This greatly increased quantity of air entrained according to the present invention facilitates use of the mortars according to the invention to provide the results and advantages referred to herein. The volumetric quantity of entrained air according to the invention can be greater than 30%, a quantity of 40% being within a desired range. When the volumetric quantity of entrained air in mortars formulated according to the present invention is to be increased over and above that amount of air entrained by admixture of the glucosaccharide additives, commercially available air entrainment agents may be used in a known fashion to increase the volumetric quantity of air entrained in the mortar.

The present invention particularly provides for the use of pozzolanic materials, particularly fly ash, in the mortar mixtures formulated according to the invention. Generally, pozzolanic materials are pulverulent siliceous or siliceous and aluminous substances which react chemically with lime and moisture at ordinary temperature to form a cementitious material. According to the present invention, pozzolanic materials, particularly fly ash which comprises the noncombustible ash carried out of a bed of solid fuel by draft, are utilized with hydraulic cement, such as portland cement, and without the addition of slaked lime to form a mortar mixture of substantial strength and which has the storage and setting characteristics referred to herein. Accordingly, while the portland cements useful according to the invention may contain lime which is not hydrated, hydrated lime is not added to the mortar mixtures according to the invention, it being thereby possible to eliminate the whiting efflorescence on the surface of mortars which typically contain hydrated lime. Further, it is known that concrete/mortar aggregates in certain geographical locations contain a water soluble calcium content which is present in sufficient quantity which, when combined with portland cement and water, accelerates the hydraulic hydration action thereof to a point that such aggregates are undesirable for use. By utilizing the glucosaccharide additives according to the teachings of the present invention in percentages at the upper portion of the desired range according to the present invention, such adverse conditions can be controlled and such aggregates can then be used without the undesirable characteristics previously encountered in their use.

Accordingly, it is to be seen that the different characteristics of portland cements and the different characteristics of aggregates which occur in different geographic locations can be overcome through the practice of the present invention such that adverse setting times do not occur under such conditions. By varying the quantity of additives according to the present invention, these differing characteristics of portland cements and aggregates can be controlled in order to produce a desired settability of mortars formed from such materials. In particular, these materials having different characteristics can be controllably suspended in a mortar mix in a desired plastic state of workability for periods of at least 72 hours, the mortar being capable of use at any time during this prolonged period as aforesaid.

Mortar formed according to the present invention has as the primary ingredients thereof standard cementitious materials which conform to certain American Society Testing Material Standards. In particular, the following materials are of particular use:

(1) Portland Cement of Types I, II and III ASTM Designation C-150;

(2) Portland Blast Furnace Slag Cement of Types IS, IS(MS), IS-A and IS-A(MS), ASTM Designation C-595 for blended hydraulic cement;

(3) Fly ash and raw or calcined natural pozzolans according to ASTM Designation C-618; and, (4) Masonry cement type II, ASTM Designation C-91 for masonry cement.

Aggregates useful in the formation of standard mortars, ASTM Designation C-144, are also useful according to the present invention. Water which is used in the formation of the present mortars should be clean and potable. Methods used for measuring materials useful in mortars according to the invention should be such that the specified proportions of the mortar materials can be controlled and accurately maintained according to ASTM Designation C-94. It is to be further understand that mortars formulated to the present invention are mixed and delivered to a job site in conformation to the requirements of the National Ready-Mix Concrete Association. The mortars formulated according to the invention are particularly to be stored in containers of suitable size and which are capable of being sealed from ambient until the mortar is to be used. Mortar proportioning in the practice of the present invention should also conform with ASTM Designations C-476, particularly Table I thereof. The ASTM Designations referred to herein are further incorporated hereinto by reference.

The additive particularly useful according to the present invention comprises saccharide polymers are described in U.S. Pat. No. 3,432,317, each said saccharide polymer being composed of glucose units and having a size of from three glucose units to on the order of 25 glucose units. It is preferred that a larger proportion of the saccharide polymers have from three glucose units to on the order of 10 glucose units in the polymer structure. The amount of the glucosaccharide polymeric additives mixed with the cementitious materials according to the present invention to produce a mortar having the characteristics described herein typically various between two and 20 ounces of the additive for each 100 pounds of cement employed in the mortar. A range of six to eight ounces of the additive is preferred for most cement materials, particularly most portland cement materials. Utilization of the glucosaccharide additives according to the invention enables sufficient air to be entrained in the mortar mixture to facilitate development of the characteristics particular to the invention, that is, the production of a desired retardation with maintenance of a desired workability of the mortar and the accomplishment of an immediate setting and strength development of the mortars on application thereof to brick, block, stucco, gunite, and other building materials. In order to produce an air entrainment factor in the mortar mixtures according to the invention, air entrainment agents of known composition can be added to the mortar mixtures in order to increase the air entrainment factor to between 12 and 35%, particularly 18 to 27% of the volume of the mortar mixture.

Water evaporation within the present mortar mixtures can be retarded in a manner additional to storage of the mortar within said sealed containers, particularly by the addition of resins, such as methyl cellulose and hydroxyethyl cellulose.

A mortar formulated according to the present invention using 6.6 ounces of the glucosaccharide additive material as described hereinabove per 100 pounds of portland cement produced case test samples having the following strength given in pounds per square inch, the mortar from which the test samples were cast containing 0.0768 units of absolute volume of portland cement and 0.0523 units of absolute volume of fly ash mixed with masonry sand and water:

| Test Results Reported in Pounds per Square Inch | | | |
| --- | --- | --- | --- |
| Time In Suspension | 7-Day Results | 28-Day Results | 28-Day Results |
| 24 Hours | 2570 psi | 3760 psi | 3920 psi |
| 48 Hours | 2705 psi | 3860 psi | 3910 psi |
| 72 Hours | 2810 psi | 3845 psi | 3830 psi |

Examples of particular mortar mixtures according to the present invention are provided hereinafter, it being understood that such examples are exemplary only and are not limiting of the invention as described herein. In each of the following examples, each unit of cement indicated as "Sacks" is a 94 pound unit. The saccharide additive employed in the examples essentially comprises glucosaccharide polymers as described hereinabove.

EXAMPLE I

| | 1 cu. yd. Batch Wt. | abs. vol. |
| --- | --- | --- |
| Cement 6.13 Sacks | 576 pounds | 2.942 |
| Ash | 192 pounds | 1.338 |
| Water 39.1 Gal. | 326 pounds | 5.227 |
| Sand | 1826 pounds | 11.089 |
| Saccharide additive to obtain 23.7% air entrainment | 7.0 ounces per 100# of cementitious materials | 6.404 (Entrained Air) |
| | 2900 pounds | 27.000 cu. ft. |
| 107.4 pounds per cubic foot Average 7-day test results 2050 psi Average 28-day test results 3365 psi | | |

EXAMPLE II

| | 1 cu. yd. Batch Wt. | abs. vol. |
| --- | --- | --- |
| Cement 5.46 Sacks | 513 pounds | 2.621 |
| Ash | 205 pounds | 1.259 |
| Water 34.7 Gal. | 289 pounds | 4.639 |
| Sand | 1948 pounds | 11.551 |
| Saccharide additive to obtain 25.7% air entrainment | 7.2 ounces per 100# of cementitious materials | 6.930 (Entrained Air) |
| | 2955 pounds | 27.000 cu. ft. |
| 109.4 pounds per cubic foot Average 7-day test results 1860 psi Average 28-day test results 2830 psi | | |

EXAMPLE III

| | 1 cu. yd. Batch Wt. | abs. vol. |
| --- | --- | --- |
| Cement 5.05 Sacks | 475 pounds | 2.424 |
| Ash | 178 Pounds | 1.240 |
| Water 41.4 Gals. | 345 pounds | 5.535 |

EXAMPLE III-continued

|  | 1 cu. yd. Batch Wt. | abs. vol. |  |
|---|---|---|---|
| Sand | 1997 pounds | 12.262 |  |
| Saccharide additive to obtain 20.5% air entrainment | 5.8 ounces per 100# of cementitious materials | 5.539 | (Entrained Air) |
|  | 2995 pounds | 27.000 cu. ft. |  |

110.9 pounds per cubic foot
Average 7-day test results 1685 psi
Average 28-day test results 2715 psi

EXAMPLE IV

|  | 1 cu. yd. Batch Wt. | abs. vol. |  |
|---|---|---|---|
| Cement 4.84 Sacks | 455 pounds | 2.323 |  |
| Ash | 182 pounds | 1.268 |  |
| Water 43.2 Gal. | 360 pounds | 5.775 |  |
| Sand | 1844 pounds | 11.322 |  |
| Saccharide additive to obtain 23.3% air entrainment | 6.9 ounces per 100# of cementitious materials | 6.312 | (Entrained Air) |
|  | 2841 pounds | 27.000 cu. ft. |  |

105.2 pounds per cubic foot
Average 7-day test results 1625 psi
Average 28-day test results 2750 psi

EXAMPLE V

|  | 1 cu. yd. Batch Wt. | abs. vol. |  |
|---|---|---|---|
| Cement 4.43 Sacks | 416 pounds | 2.126 |  |
| Ash | 208 pounds | 1.449 |  |
| Water 42.1 Gal. | 351 pounds | 5.628 |  |
| Sand | 2245 pounds | 13.785 |  |
| Saccharide additive to obtain 14.9% air entrainment | 2.0 ounces per 100# of cementitious materials | 4.012 | (Entrained Air) |
|  | 3220 pounds | 27.000 cu. ft. |  |

119.3 pounds per cubic foot
Average 7-day test results 1520 psi
Average 28-day test results 2350 psi

EXAMPLE VI

|  | 1 cu. yd. Batch Wt. | abs. vol. |  |
|---|---|---|---|
| Cement 5.6 Sacks | 526 pounds | 2.688 |  |
| Ash | 263 pounds | 1.832 |  |
| Water 33 5 Gal. | 279 pounds | 4 479 |  |
| Sand | 1686 pounds | 10.352 |  |
| Saccharide additive to obtain 28.3% air entrainment | 8.0 ounces per 100# of cementitious materials | 7 469 | (Entrained Air) |
|  | 2754 pounds | 27.000 cu. ft. |  |

102 pounds per cubic foot
Average 7-day test results 1890 psi
Average 28-day test results 2855 psi

EXAMPLE VII

|  | 1 cu. yd. Batch Wt. | abs. vol. |  |
|---|---|---|---|
| Cement 5.6 Sacks | 526 pounds | 2.668 |  |
| Water 41.2 Gal. | 343 pounds | 5.508 |  |
| Sand | 1928 pounds | 11.838 |  |
| Saccharide additive to obtain 25.8% air entrainment | 7.2 ounces per 100# of cementitious materials | 4.012 | (Entrained Air) |
|  | 2797 pounds | 27.00 cu. ft. |  |

103.6 pounds per cubic foot
Average 7-day test results 1900 psi
Average 28-day test results 2930 psi The foregoing is considered as illustrative only of the principles of the invention. Further, since numerous modifications and change will readily occur to those skilled in the art, it is not desired to limit the invention as explicitly described, all suitable modifications and equivalents which may be resorted to, falling within the scope of the invention.

What is claimed as new is as follows:

1. A method for controlling the initiation of hydraulic hydration of hydraulic mortar mixtures formed of cementitious material, aggregate and water to allow prolongation of the setting times of such mixtures while retaining workability prior to setting and retaining normal strength characteristics subsequent to setting and to cause the setting rate on initiation of hydraulic hydration to be at least as rapid as that of hydraulic mortar mixtures which have not undergone suspension of hydraulic hydration, comprising the steps of:

mixing with the hydraulic mortar mixture an effective amount of an additive comprised of saccharide polymers, each said saccharide polymer being composed of glucose units and having a size of from 3 glucose units to on the order of 25 glucose units;

storing the resulting admixture of additive and hydraulic mortar mixture under sealed conditions for a period of time exceeding the normal setting time of the hydraulic mortar mixture to minimize moisture evaporation from the admixture; and removing the admixture from the sealed conditions at ambient atmospheric pressure at the time of intended use of the admixture to allow initiation of setting to proceed.

2. The method of claim 1 wherein the additive is mixed with the hydraulic mortar mixture in a weight ratio between 2 and 20 ounces of the additive for each 100 pounds of cementitious material.

3. The method of claim 1 wherein the additive is composed of a larger proportion of saccharide polymers having 3 glucose units to on the order of 10 glucose units.

4. The method of claim 1 and further comprising the step of:

applying the admixture of additive and hydraulic mortar mixture to brick, block and the like after removal of the admixture from the sealed conditions to facilitate setting of the admixture.

5. The method of claim 1 wherein the step of mixing of the additive and hydraulic mortar mixture further comprises entraining air in the mixture in a range by volume of between 12 and 35% of the admixture.

6. The method of claim 1 and further comprising the step of:

entraining air in the admixture in a range by volume of between 20 and 30% of the admixture prior to storing of the admixture.

7. The method of claim 5 wherein the range is between 25 and 30%.

* * * * *